United States Patent [19]

Rabenau et al.

[11] Patent Number: 4,518,390
[45] Date of Patent: May 21, 1985

[54] LENS TINTING FIXTURE AND SYSTEM UTILIZING SAID FIXTURE

[75] Inventors: Richard Rabenau; Jeffery A. Ryder, both of Arab, Ala.

[73] Assignees: Ryder International Corporation, Arab, Ala.; National Patent Development Corporation, New York, N.Y.

[21] Appl. No.: 592,694

[22] Filed: Mar. 23, 1984

[51] Int. Cl.³ .................. B05C 3/00; B05C 19/02; G03B 21/46; B05D 5/06
[52] U.S. Cl. .................................. 8/507; 118/421; 118/429; 351/162; 427/164
[58] Field of Search .......... 8/507; 118/421, 429; 351/160 H, 162; 427/164

[56] References Cited

U.S. PATENT DOCUMENTS 4,252,421  2/1981  Foley ............................ 351/162
4,457,761  7/1984  Sliger ............................. 8/507

*Primary Examiner*—Michael R. Lusignan
*Attorney, Agent, or Firm*—Trexler, Bushnell & Wolters, Ltd.

[57] ABSTRACT

There is disclosed a fixture or apparatus for use in the tinting of a contact lens or the like. The fixture includes a tube having a body portion and a closed end portion, which includes an annular masking structure to support the lens and define a ring-like unmasked area. Proximate the masking structure, a tinting medium receiving chamber is defined. A method for using the fixture is also disclosed. In an upright position, the tube body portion is filled with a preparatory solution. Into this fluid-filled tube, a contact lens is dropped. As the dropped lens passes through the liquid column, the hydraulic forces acting thereon produce a state of dynamic equilibrium, with the lens convex side down. This action tends to properly position and center the lens as it comes to rest upon the mask structure. Next, a mandrel device is inserted into the tube to fix the lens in place against the mask. The mandrel is locked into position in the tube, the tinting chamber is drained and then the tube is then inverted to drain the remainder of the column of fluid from the body portion. Tinting medium is subsequently introduced into the tinting chamber and a permanent tint is applied to the unmasked annular area of the lens.

30 Claims, 7 Drawing Figures

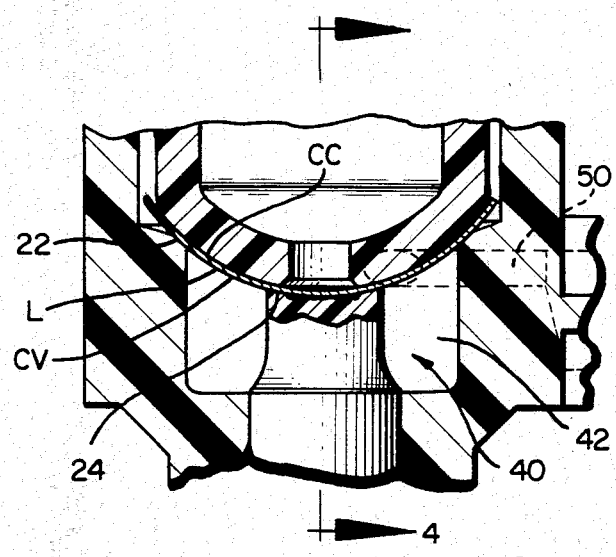
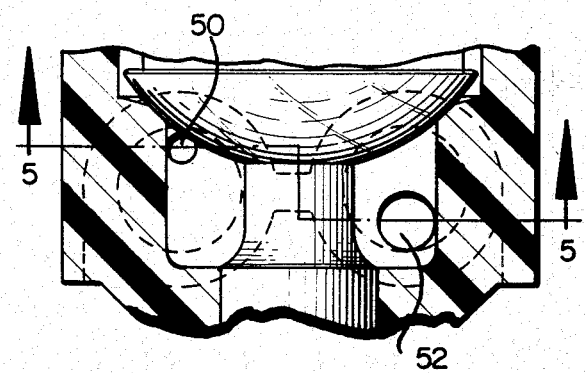
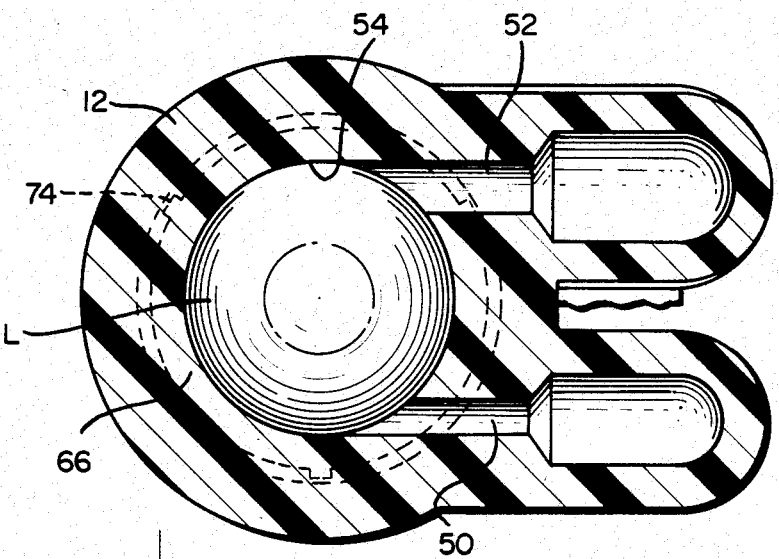
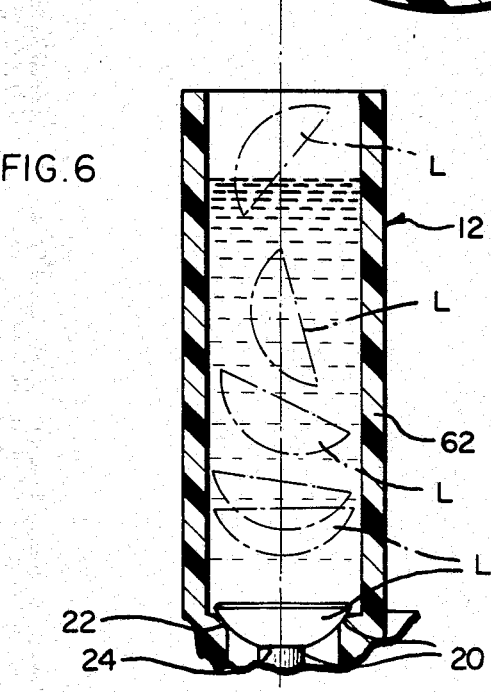
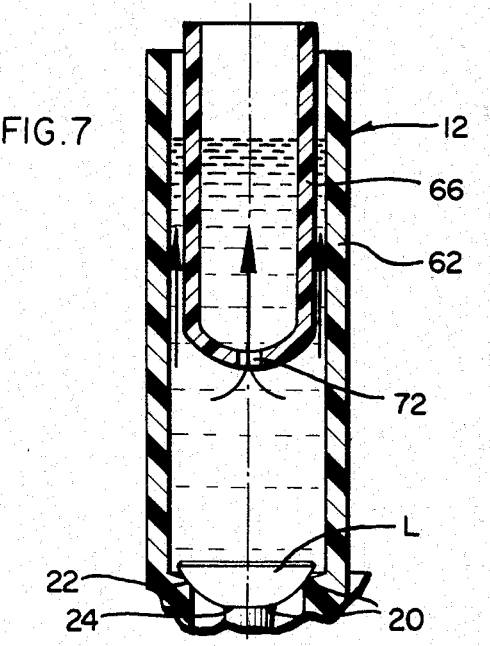

LENS TINTING FIXTURE AND SYSTEM UTILIZING SAID FIXTURE

BACKGROUND OF THE INVENTION

This invention relates generally to the tinting or coloration of contact lenses for human eyes.

For some time now, it has been possible to correct or improve the vision of the human eye by disposing a small, transparent lens directly upon the surface of the eyeball. The contours of this contact lens supplement and correct the effects of the biological lens within the eyeball.

Early contact lenses were primarily of the "hard" variety. More recently, however, so-called "soft" contact lenses have been introduced, and these lenses have met with considerable popularity. "Soft" contact lenses are manufactured from a hydrophyllic plastic material; that is, they can absorb and retain water, and become soft and pliable upon the absorbtion of water. They are relatively comfortable for the user to wear, and can be worn for relatively long periods of time.

Tinted or colored "soft" contact lenses have advantages or attractions to a variety of contact lens users. Tinted lenses provide cosmetic improvement for persons having one, or both, eyes which have been disfigured by illness or accident. Tinted lenses can be used by patients with diplopia to make them appear more normal. Also tinted lenses may provide albino and aniridic patients with improved general facial appearances. Suitably tinted lenses can also reduce light transmission and give the patient increased visual comfort.

Several methods of coloring central areas of contact lenses are suggested in U.S. Pat. No. 4,252,421 to Foley, Jr. However, the tinting or coloration of contact lenses is not a simple task. If colors are printed on transparent lenses, the coloration may not be uniformly dispersed through the lens material. Moreover, the color printed upon such lenses tends to fade after several cleanings or autoclavings.

It is important that the tinted or colored lens provide a natural appearance in the wearer's eye, of course. Thus, a natural-appearing soft contact lens should have a clear central area, a colored intermediate area and a clear outer area so that the colored portion will not cover the sclera of the eye. Moreover, the central portion of the lens should be uncolored to permit maximum light passage into the eye interior. Thus, it is desirable to be able to provide the lens with a ring-like annular tinted area, surrounded by clear, untinted lens material.

In manufacturing single-part tinted lenses, several problems can arise in mounting a lens on a tinting fixture. It is important that the worker not handle the lens directly with his or her fingers or fingertips, because the minute amounts of oil contained on the worker's fingertips will prevent the dye from being accepted or absorbed evenly by the lens. If the worker uses gloves, dexterity can be reduced. This dexterity is important in manipulating the small lenses and centering the lens on the tinting fixture. If the worker uses tweezers and manually mounts the lens on a fixture, lens production can be slow, and accuracy in the mounting may be compromised.

As suggested above, it is important that the tinted annular area of the lens, and correspondingly the clear central portion be precisely defined and accurately located. That is, even slight fuzziness or running of dye colors into otherwise uncolored areas of the lens will be immediately apparent. Fuzziness or tint runs will necessitate the rejection of the finished lens product.

SUMMARY OF THE IVENTION

Accordingly, there is disclosed a lens fixture and method for precisely and inexpensively mounting a contact lens and defining the area to be tinted. In general, this apparatus comprises a tube having a body portion and a closed end portion defined partially by lens masking structure in communication with the tube body. Suitably treated water is placed in the tube to form a fluid column. Into this fluid column, the lens to be tinted is dropped. As the lens falls through the fluid, the lens attains a state of dynamic equilibrium, with a lens convex side down. Further, the hydraulic forces acting on the lens as it passes through the column of water will cause the lens to center itself with respect to the interior of the tube body. Thus, as the lens reaches the bottom of the tube, it will be centered as it comes to rest upon the lens mask structure formed at the tube bottom. In a preferred embodiment of the invention, this mask structure includes two coaxial seats defining an open annular lens area therebetween. It is this annular area which is to be tinted.

When the lens is centered on the mask, a mandrel device is inserted into the tube. This mandrel has a nose which substantially conforms to the concave surface of the lens. Thus, when the mandrel engages the lens concave side, the convex side of the lens is pushed into firm engagement with the mask structure. The mandrel is then locked within and upon the tube. As the mandrel passes through the liquid column it also will be centered due to hydraulic forces acting thereon which produce a state of dynamic equilibrium. Thus, upon engaging the lens the mandrel is also centered relative to the tube body.

Thereafter, the fixture is inverted and the fluid column in the tube drained away. Next, a tinting medium or dye solution is introduced into a chamber formed in the tube bottom proximate the mask structure. This tinting medium is exposed only to the unmasked portion of the lens and will permeate the lens material of the unmasked portion to provide the desired tint.

Other aspects of the invention will become apparent upon reading the following detailed description and upon reference to the drawings. Throughout the drawings, like reference numerals refer to like parts.

BRIEF DESCRIPTION OF THE DRAWINGS

FIG. 3 is a fragmentary sectional view showing in further detail the masking portion of the fixture in a position as per FIG. 1, and inverted from that shown in FIG. 2;

FIG. 4 is a fragmentary sectional view taken substantially in the plane of line 4—4 in FIG. 3;

FIG. 5 is a sectional view taken substantially in the planes of lines 5—5 in FIG. 4;

FIG. 6 is a fragmentary sectional view showing the motion of a contact lens as it passes through a column of fluid contained within a tube portion of the novel fixture; and FIG. 7 is a fragmentary sectional view similar to FIG. 6 and showing action of the fluid as a mandrel member is inserted into the tube.

DETAILED DESCRIPTION

While the invention will be described in connection with a preferred embodiment and procedure, it will be understood that it is not intended to limit the invention to this embodiment or procedure. On the contrary, it is intended that the invention cover all alternatives, modifications and equivalents as may be included within the spirit and scope of the invention as defined by the appended claims.

Figure 1:
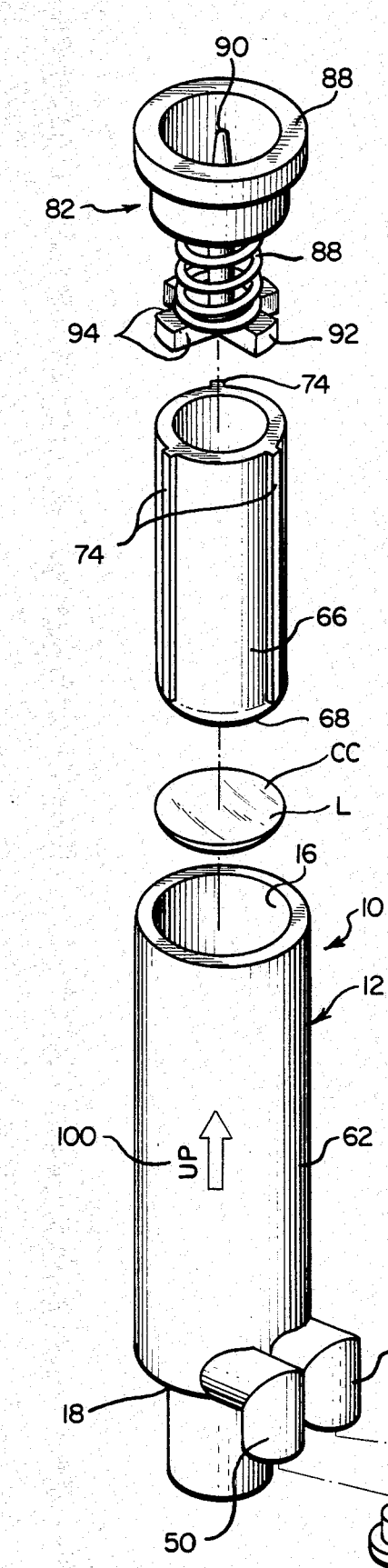
FIG. 1 is an exploded view of the apparatus comprising the invention.
Figure 2:
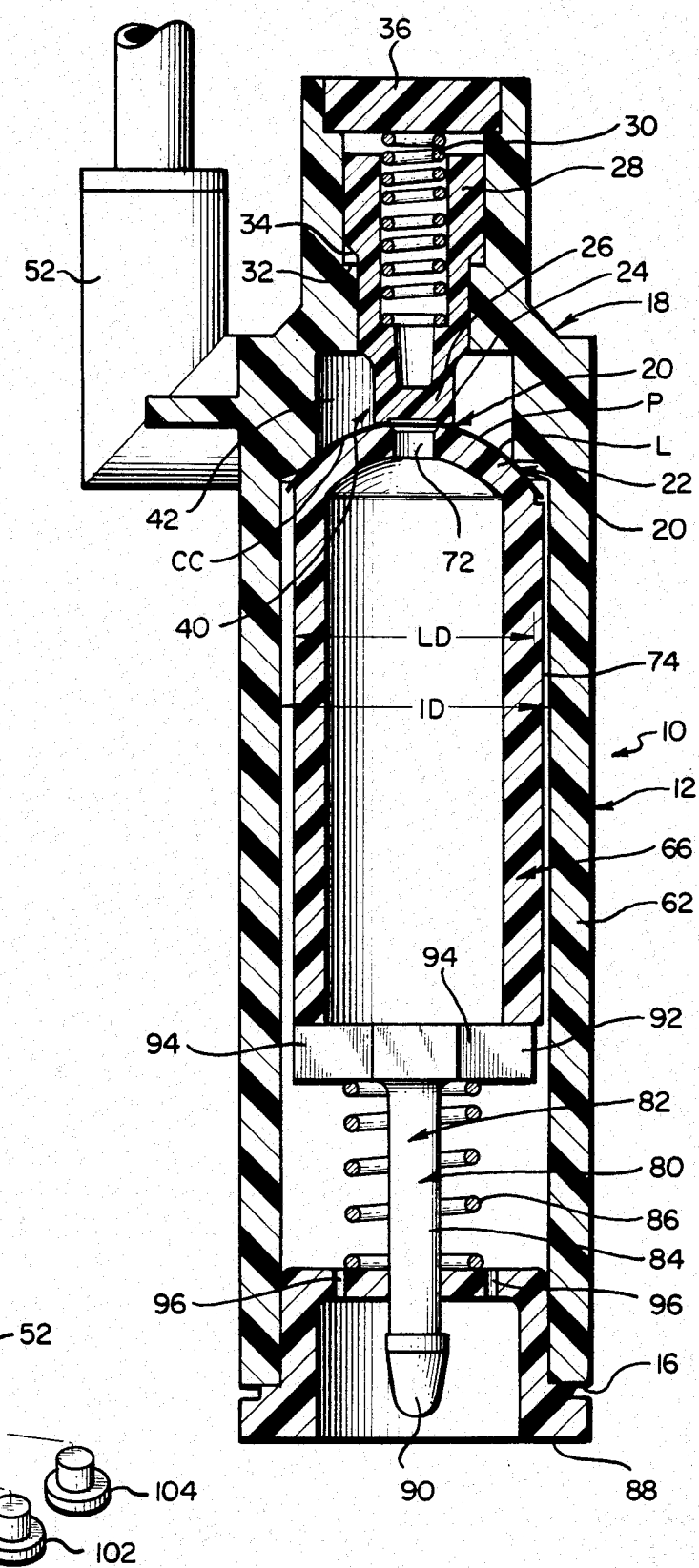
FIG. 2 is a sectional view showing the apparatus of FIG. 1 in its assembled condition and inverted.

Turning first to FIGS. 1 and 2, there is shown a preferred embodiment of the fixture or apparatus 10 comprising the invention. In general, the fixture or apparatus 10 can be considered to include a elongate tube 12 into which a contact lens L can be dropped or otherwise inserted. One end 16 of this tube 12 is generally open, while the other end 18 is closed by specially designed masking structure.

The tube-closing structure 18 includes a lens mask structure 20. Here this mask structure includes an outer, annular seat or mask portion 22; and spaced apart therefrom but coaxial therewith, an inner seat or mask portion 24. To provide desired resiliency in supporting, engaging, and masking portions of the contact lens L, this inner seat or mask 24 is formed on the nose 26 of a plunger 28 which is biased, as by a spring 30, toward the lens L. Thus, the spring biasing means 30 urges the inner mask seat 24 toward the lens L and into firm contact therewith. Plunger motion toward the lens L is halted or restrained by a shoulder 32 formed on the bottom portion of the tube 12; a mating shoulder 34 is formed on the plunger 28. The spring 30 and plunger 28 are retained within the tube structure 12 by any convenient device such as a cap or plug 36.

A chamber means 40 is provided at the closed end of the tube 20 proximate the mask structure 20 for providing tinting medium to the unmasked portions P of the lens L. Here, this chamber 40 includes a cylindrical cavity 42 surrounding the plunger nose 26 and inner mask seat 24, and disposed inwardly of the outer mask portion 22.

To admit a fluid tinting medium or dye solution to the chamber cavity 42, inlet and outlet ports are provided, as shown in FIGS. 2, 4 and 5. Tinting medium is encouraged to swirl through the chamber 40 and past the lens L by orienting the inlet and outlet ports 50, 52 substantially tangential to a wall 54 of the cylindrical cavity 42. To encourage the removal of bubbles of air and the accumulation of any preliminary solution squeezed out of the lens during lens capture, the inlet port 50 is smaller than the outlet port 52, and the inlet port 50 is located tangentially as noted above, and also at an axially upper position, relative to the outlet port 52.

The tube 12 includes an elongate body portion 62 capable of retaining a column of fluid. In accordance with the invention, the diameter of this body portion 62 is just slightly greater than the diameter of the lens L. Preferably, the internal diameter ID of the tube body portion 62 is approximately 2 mm. larger than the lens diameter LD. The height of the column of fluid and the height of the body portion 62 is from one to three times the diameter of the lens LD, and preferably two and one half times the lens diameter LD. When the lens L is then dropped into the fluid-filled tube 12, the contact lens decends through the fluid and attains a state of dynamic equilibrium, with a lens convex side CV down, as suggested in FIG. 6. As the lens falls downwardly through the column of fluid, the hydraulic forces acting on the lens will operate to center the lens with respect to the tube. Thus the lens will be in both the desired orientation and properly centered when it engages the mask means 20.

To engage the lens L and secure the lens L against the mask means or structure 20 in a position to be contacted by the tinting medium, a mandrel 66 is inserted into the tube 62 as suggested in FIGS. 2 and 7. This mandrel 66 is provided with a rounded nose portion 68 adapted to engage the concave side CC of the lens L.

So that the column of fluid will not overflow the open top 16 of the tube 12, the mandrel 66 is hollow, and a port or hole 72 is formed in the mandrel nose 68 to permit the fluid to flow into the mandrel interior, as illustrated in FIG. 7. This permits the mandrel 66 to sink into the fluid in the tube means with a controlled motion; the mandrel being centered by the hydraulic forces in the same manner as was the lens L. In addition, external spacer ribs 74 are formed on the outside of the mandrel 66 so as to space the mandrel 66 from the tube body wall and permit the fluid to flow between the mandrel 66 and tube body wall to further enhance the centering action.

When the mandrel 66 has been fully inserted into the tube 12, a mandrel lock mechanism 80 is inserted into the tube 12 to force the mandrel 66 against the lens L and force the lens L against the mask structure 20. As illustrated in FIGS. 2, 3 and 4, this locking mechanism 80 takes the form of a plunger 82 which is provided with a stem 84 surrounded by a compression spring 86. A lock cap 88, which can conveniently be of the plug type, is secured to the plunger stem 84; here, the plunger stem 84 is provided with an enlarged nose 90 to prevent loss of the cap 88 from the stem 84.

It will be noted that the plunger 82 is provided with an enlarged base 92, but this base 92 is provided with several cut-away formations 94. Further, the cap 88 is provided with several drain holes 96. Thus, when the assembled tube and mandrel arrangement is inverted from the initial or assembly position shown in FIG. 1 to the operating position shown in FIG. 2, the column of fluid drain out of the tube.

METHOD OF USING THE LENS TINTING FIXTURE

Using the fixture of the present invention to produce a tinted contact lens is not difficult, and can be accomplished by even inexperienced personell quickly and easily and at a minimal cost, and requires no special skills or manual dexterity.

First, the tube assembly shown in FIG. 1 is located in a rack or holder, not shown, in the assembly position as shown in FIGS. 1, 6 and 7. Port plugs 102, 104 are inserted in the respective inlet and outlet ports 50, 52 to prevent loss of fluid. Next, the tube is filled to an appropriate height with a receiving or preparatory fluid that insures that the lens will be maintained in a sterile and hydrophilic condition.

Next, the lens to be tinted is picked up by tweezers or some other clean device, and is deposited into the fluid and allowed to sink freely toward the closed end of the tube assembly 12. As it drops, the lens will orient and center itself as suggested in FIG. 6, and will finally come to rest on the mask structure 20, as shown in FIGS. 6 and 7, not only with the convex side down, but properly centered relative to the mask structure 20.

Thereafter, the mandrel 66 is dropped into the tube 12, as suggested in FIG. 7. The mandrel will also center itself, and the mandrel nose 68 will engage the concave side CC of the lens L. Fluid flows into the interior portion of the mandrel 66 through the port 72, as explained previously, so as to permit the mandrel 66 to sink into the lense-engaging position and to avoid fluid overflow and spillage.

The mandrel locking assembly 82 is thereafter inserted into the open top 16 of the tube 12. By this action, the mandrel 66 is pressed into firm engagement with the lens L, and the lens L is pressed into firm engagement with both the outer mask 22 and the inner mask 24 of the masking structure 20. It will be recalled that the inner mask 24 can be displaced slightly by this mandrel forcing action against the action of the plunger biasing spring 30.

The completely assembled device, with the captured lens, is now visually checked to be sure that the lens L has been properly seated. To this end, the tube 12 and other parts of the assembly are preferably formed of transparent plastic or other suitable materials. However, the mandrel 66 formed of opaque plastic, so as to enable the operator to better see the lens L. If the lens has not been properly located and seated, the mandrel locking mechansim 82 and mandrel 66 are removed, and the lens is then removed. The lens is then re-dropped, and the mechansim is reassembled.

If the lens has been properly captured and secured, the plugs 102 and 104 are removed to drain the preparatory fluid from the tinting chamber 40. Next the entire assembly or fixture is inverted into the position shown in FIG. 2. As explained above, this inversion motion permits the fluid column on the side of the lens opposite the tinting chamber 40 to be drained from the assembled fixture.

In a preferred method of lens tinting, the entire fixture and lens may then be heated prior to introduction of the tinting agent or medium. When the fixture and lens have reached a steady elevated temperature, a dye solution or tinting medium is introduced into the tinting chamber 40 through the inlet port 50. Because of the size and location of the inlet port 50 and outlet port 52 described above, the tinting medium enters the tinting chamber 40 tangentially to the walls thereof with a low pressure swirling action. This fluid swirling action ensures an even application of the tinting medium to the unmasked area of the lens. Also this action causes any bubbles of air to be removed from the convex surface CV of the lens L, which constitutes the temporary bottom surface of the tinting chamber 12. These air bubbles are then swept out through the outlet port. Removal of air bubbles in this way is highly desirable, because the presence of bubbles on the surface of the lens L can cause voids or irregularities in the finished tint.

It will also be noted that any preparatory solution on the lens L which has been squeezed out of the lens by the locking or securing action of the mandrel 66, will also be swept out of the tinting chamber 42. If this solution were allowed to accumulate in the tinting chamber, the tint medium might be diluted and an unever tinting action might result.

After an appropriate period of tinting time, the tinting medium or dye solution is flushed out of the chamber by an injection of distilled water. Next, a fixing agent is introduced into the tinting chamber 40 to oxidize or fix the dye deposited upon and in the lens L. After the fixing agent has contacted the lens, another rinsing or flushing injection of distilled water is introduced to remove residual fixer. Thereafter, a final rinse is circulated through the chamber 40 to neutralize any residual acids and insures that the tinted lens is returned to an acceptable pH level.

Finally, the mandrel lock assembly 82 is removed, and the mandrel 66 is removed. The lens is now removed from the fixture 10 and given a final inspection before passage to packaging, transport and sale.

There has been disclosed a preferred construction and method of use for the fixture 10 of the present invention. It is anticipated that those skilled in the art may devise various alternatives or modifications to the disclosed embodiment, once possessed of the present disclosure. As such this disclosure is not intended to limit the invention, but rather to illustrate a preferred embodiment, the spirit and scope of the invention being defined by the claims appended hereto.

The invention is claimed as follows:

1. Apparatus for tinting a contact lens or the like, the apparatus comprising, in combination: an elongate tube means capable of receiving a contact lens; mask means closing an end of the tube means and upon which a lens is seated and for engaging at least part of the lens and inhibiting the engaged part of the lens from being contacted by dye tinting medium, a body portion capable of retaining a column of fluid, the diameter of the body portion being slightly greater than the diameter of the lens and the height of the body portion being sufficient to permit the contact lens to attain a state of dynamic equilibrium, with a lens convex side down, as the lens falls downwardly through the column of fluid and consequently centers itself as it drops upon the mask means, chamber means provided at the closed end of the tube means proximate the mask means and communicating with the tube and a masked lens for providing tinting medium to the unmasked portions of the lense, and mandrel means disposable at least partly in said tube member and adapted to engage the contact lens and secure the lens against the mask means in a position to be contacted by the tinting medium.

2. Apparatus according to claim 1 wherein said mandrel is adapted for insertion into the tube means, and is provided with a nose portion for engaging one side of the lens.

3. Apparatus according to claim 2 further including mandrel lock means for locking the mandrel means inside the tube means.

4. Apparatus according to claim 2 wherein said tube means is adapted to contain a column of fluid, and wherein said mandrel means is hollow, and wherein said mandrel means includes port means for permitting the mandrel means to sink into the fluid in the tube means with controlled motion.

5. Apparatus according to claim 1 wherein said mask means includes at least two coaxial, seat portions spaced apart from one another to define an annular, unmasked tintable area on the contact lens.

6. Apparatus according to claim 5 wherein one of said seat portions is an inner seat, the apparatus further including biasing means for urging the inner seat toward the lens and into firm contact therewith.

7. Apparatus according to claim 1 wherein said mandrel means is provided with a nose portion for engaging one side of the lense, and wherein said mask means includes at least one seat portion for engaging at least part of an opposite side of the lens.

8. Apparatus according to claim 7 wherein said mandrel nose portion is adapted to engage a concave side of the lense, and wherein said mask means is adapted to engage a convex side of the lens.

9. Apparatus according to claim 1 wherein said chamber means includes a cylindrical cavity, and inlet and outlet ports oriented substantially tangential to the cylindrical cavity wall, whereby to encourage the tinting medium to swirl through said chamber and past the lens.

10. Apparatus according to claim 9 wherein said mask means includes an inner seat and an outer seat, and wherein said chamber cavity surrounds the inner seat.

11. Apparatus according to claim 9 wherein said inlet port is located at an axially upper location, and wherein said outlet port is located at an axially lower location, whereby to encourage a complete and even sweeping-action passage of tinting medium past said lens and consequent complete and even tinting of said lens.

12. Apparatus according to claim 1 wherein said tube body portion is at least as long as the diameter of the lens.

13. Apparatus according to claim 1 wherein said tube body portion is no more than three times as long as the diameter of the lens.

14. Apparatus according to claim 1 wherein said tube body portion is substantially two and one-half times as long as the diameter of the lens.

15. Apparatus according to claim 1 wherein said mandrel means includes port means for permitting the mandrel means to sink into the tube means with controlled motion, and wherein said mandrel nose is provided with a shape substantially conforming to a convex side of said lens to permit the mandrel nose to engage the concave side of said lens with substantially even surface contact pressure.

16. Apparatus according to claim 15 wherein said mandrel means is provided with external spacer means for spacing the mandrel from a tube body wall as the mandrel is dropped into the tube and fluid, whereby to permit the fluid to flow between the mandrel and tube body walls.

17. Apparatus for tinting a contact lens or the like, the apparatus comprising, in combination: tube means having a tube body portion and an end portion closing one end of the tube body portion; the tube means being capable of at least temporarily retaining a column of fluid and receiving a contact lens dropped into the fluid column; the end portion including mask means adapted to engage and support the lens and mask certain portions thereof; and means for providing tinting medium to the unmasked portions of the lens.

18. Apparatus according to claim 17 including mandrel means for engaging a concave side of the lens and securely urging a convex side of the lens against the mask means.

19. Apparatus according to claim 18 including mandrel lock means for resiliently locking the mandrel in its lense-engaging position.

20. Apparatus according to claim 17 wherein said mandrel lock means is provided with a drain system for permitting the column of fluid to be drained from said tube.

21. Apparatus according to claim 18 wherein said mandrel means is provided with rib spacer means for spacing a mandrel wall from a tube body wall as the mandrel is dropped into the tube, whereby to permit fluid to flow between the walls.

22. Apparatus according to claim 17 wherein said tube body means has a height sufficient to support said fluid column, the fluid column having a height sufficient to permit a contact lens dropped there into to attain a state of dynamic equilibrium, with a lens convex side down, as the lens falls downwardly through the column of fluid.

23. Apparatus according to claim 17 wherein said tube body portion has a diameter only slightly larger than that of the contact lense, and has a length such that when said tube means is filled with a column of liquid and a lens is deposited therein, said lens will fall through column of liquid with the hydraulic forces acting thereon producing a state of dynamic equilibrium, with the lens convex side down, and tending to properly position and center the lens relative to said tube means body portion, so that the lens may be deposited upon said mask means in centered relationship and with the convex side thereof engaging said mask means.

24. A method of tinting a contact lens by using a tube-like structure which is closed at one end by structure which includes mask means and which is open at the other end, the method comprising the steps of; orienting the tube-like structure in a first position with the open end upward; adding a fluid column to the interior of said tube structure; dropping the lens to be tinted into the fluid in the tube, and permitting the lens to sink through the fluid column, so as to cause the lens to orient and center itself relative to the tube, permitting the oriented and centered lens to come to rest on mask structure defined in the tube bottom, inserting a mandrel member into the tube and fluid to secure the lens in place between the mandrel and the mask structure, applying a dye tinting medium to unmasked portions of the secured and masked lens.

25. A method according to claim 24 including the steps of locking said mandrel at least partly within and relative to said tube, and thereafter inverting said mandrel and tube.

26. A method according to claim 24 including the step of checking said tube, said captured lense, and said mandrel to be sure the lens is properly seated on the mask structure and is properly captured by the mandrel prior to applying the tinting medium to the lens.

27. A method according to claim 24 including the step of draining the fluid from said tube structure after said lens is captured between the mandrel and the mask structure and before applying tinting medium to the lens.

28. A method according to claim 24 including the step of inverting said tube, said mandrel, and said captured lens prior to introducing tinting medium to said lense, and draining said fluid column from said tube structure interior.

29. A method according to claim 24 further including the step of removing said tinting medium, and thereafter applying a fixing medium to said tinted lens to fix said tint to and in said lens.

30. A method according to claim 29 further including the step of flushing said lens and fixed tinting material after applying said fixing medium to said lens.

* * * * *